April 17, 1962 J. O. PARR, JR 3,029,894
SONIC PROSPECTING

Filed Jan. 20, 1958 2 Sheets-Sheet 1

INVENTOR
Josephus O. Parr Jr

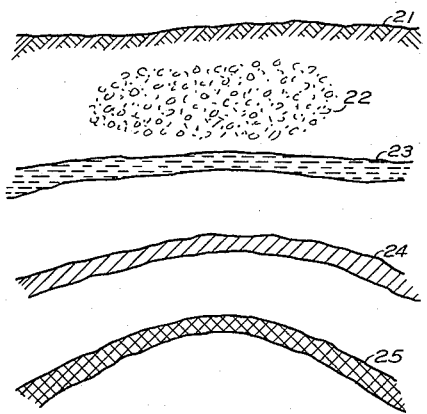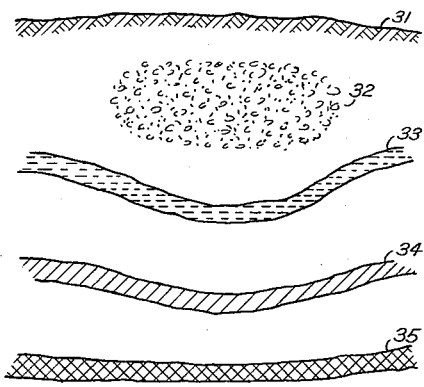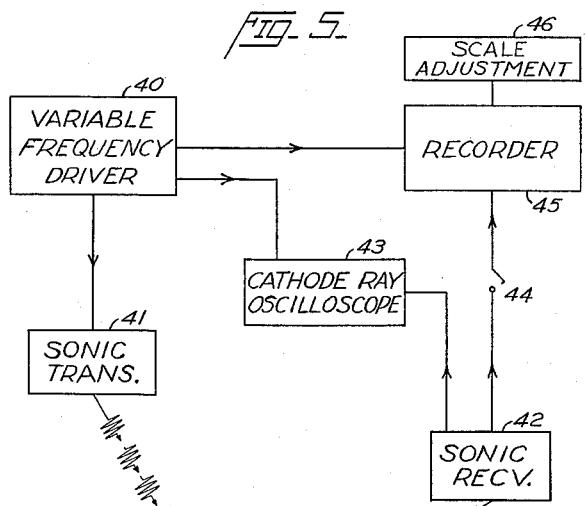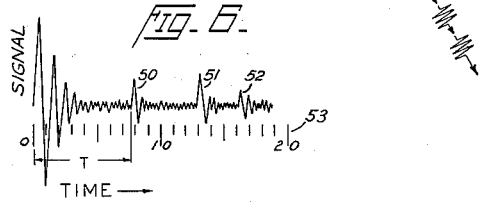

United States Patent Office 3,029,894
Patented Apr. 17, 1962

3,029,894
SONIC PROSPECTING
Josephus O. Parr, Jr., San Antonio, Tex., assignor to Olive S. Petty, San Antonio, Tex.
Filed Jan. 20, 1958, Ser. No. 709,957
2 Claims. (Cl. 181—.5)

This invention relates to sonic prospecting and particularly to methods and apparatus for improving the accuracy of sonic depth indications. More specifically, the invention is directed toward providing accurate sub-surface information by sonic prospecting in areas characterized by large velocity variations due to highly aerated or gaseous layers near the surface.

In sonic prospecting for buried geological features which may contain or be associated with economically valuable deposits of petroleum or minerals, the usual procedure is to impress sonic energy on the surface or near-surface of the earth and to intercept, detect and record the sonic signals which have traveled over various paths in the sub-surface. When satisfactory sub-surface conditions exist, numerous reflections, from the strata interfaces within the earth, may be identified by visual inspection of the recordings. In certain prospect areas of interest, however, large variations in the velocity of sonic waves in the near-surface strata make correct determination of true depths difficult or impossible. A velocity problem of this type occurs along the Gulf Coast of the United States where large regions are covered partially by swamps or marshes. In these regions the surface layers may contain considerable amounts of air or marsh gas which is trapped within the soil or mud particles. As will be shown, large variations in sonic velocity occur in these highly aerated or gaseous earth sections, resulting in corresponding large errors in indicated depths of strata. Such errors in indicated depth may lead to quite incorrect representations of the sub-surface and, in some instances, may obscure geological features of considerable interest.

Accordingly it is a primary object of this invention to provide a method and apparatus for sonic prospecting in regions characterized by large variations in sonic velocity. Another object is to provide a sonic prospecting system in which provision is made for the detection and correction of large variations in travel-time in the near-surface layers. A further object is to provide a method and means for determining the presence of and making corrections for unusual sonic velocity variations due to highly aerated or gaseous strata.

The foregoing and other objects are achieved in the present invention in which certain velocity characteristics of a highly aerated or gaseous strata are utilized. In the past it has been well-known to use a single sonic frequency in prospecting for sub-surface features. In this invention, however, a plurality of sonic transmission frequencies is used so as to permit detection of and correction for any large and rapid variation in the sonic velocity.

For a further understanding of the present invention, reference is now made to the following description and the accompanying drawings in which:

FIGURE 3 is a cross setcion of the earth showing a geological feature located beneath a highly aerated or gaseous stratum;

FIGURE 4 is a cross section of the earth illustrating the apparent cancellation of a geological feature by a low velocity aerated or gaseous strataum near the surface;

FIGURE 5 is a block diagram of one arrangement of apparatus to practice the present invention; and FIGURE 6 is a waveform illustrating an oscilloscopic tracing of electrical signals corresponding to sonic signals present at one circuit location in FIGURE 5.

Figure 1:
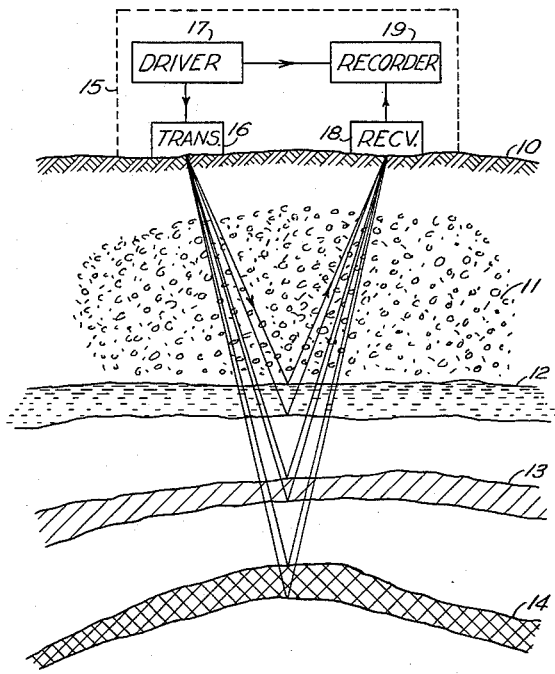
FIGURE 1 is a cross section of the earth shown in conjunction with block diagrams illustrating the usual arrangement of equipment for sonic prospecting.

Referring now to FIGURE 1 of the drawing, a cross section of the earth is shown diagrammatically with surface 10 and several reflecting sub-surface beds 12, 13 and 14. A highly aerated or gaseous stratum 11 is located between the surface 10 and first reflecting bed 12. In a typical prospecting arrangement, the sonic equipment 15, shown in the dotted enclosure, is located on the surface 10 and operated so as to direct signals toward and obtain reflections from the sub-surface beds 12, 13 and 14. Usually equipment 15 will be comprised by a sonic transmitter 16, driver unit 17, sonic receiver 18 and signal recorder 19. In some equipments transmitter 16 and receiver 18 may actually be comprised by a single unit, but for the sake of clarity in illustration and description, separate units are shown. Any of the well-known types, such as magneto-strictive or crystal, may be employed for transmitter 16 and receiver 18. Transmitter 16 is excited by driver unit 17 which is arranged to produce a continuous train of equally spaced electrical impulses which are comprised by a number of cycles of a higher frequency carrier wave. The pulse duration, repetition rate and carrier frequency must be carefully chosen for the desired depth of penetration and for the earth constants encountered in the particular prospect area. Signal recorder 19 may be of a type suitable for displaying the sonic signals intercepted by receiver 18 as a function of time. Operation of the prospecting arrangement shown in FIGURE 1 may be described briefly as follows. Driver unit 17 applies electrical impulses to sonic transmitter 16 which as a result impresses sonic impulses on the surface 10. Simultaneously with application of the electrical impulse to transmitter 16, driver unit 15 furnishes a synchronizing signal to recorder 19 so as to cause recorder 19 either to commence operation or pass through a zero position. Sonic impulses from transmitter 16 are propagated through the sub-surface as sonic signals and are partially reflected at the interfaces of the several sub-surface beds 12, 13 and 14. The reflected sonic signals are intercepted at the surface 10 by sonic receiver 17 and converted into electrical signals suitable for application to the recording medium of recorder 19. Recorder 19 preferably furnishes a visual recording in which the sonic information is plotted against a time axis. From such recordings the depths of the reflecting sub-surface beds or strata may be determined. Furthermore, a large number of continuous or closely spaced recordings, made across a given prospect area, may be assembled on a single display medium so as to furnish a simulated cross sectional view of the sub-surface.

Figure 2:
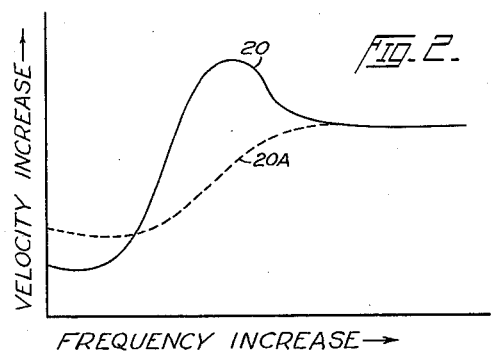
FIGURE 2 is a curve showing the variation of sonic velocity with frequency in an aerated or gaseous stratum.

When propagation conditions within the earth are favorable, the sonic recordings made in accordance with the above described arrangement produce accurate indication of the depths of the various reflecting beds. In certain areas, however, conditions may exist which greatly reduce the accuracy, unless suitable corrections are carried out. For example, in FIGURE 1 there is shown a highly aerated or gaseous stratum 11 between the surface and the reflecting bed 12. This highly aerated or gaseous stratum, which actually is a mixture of air or gas bubbles and soil, has certain characteristics which are illustrated in the curves shown in FIGURE 2. Sonic velocity in an aerated or "bubbled" stratum is shown as a function of sonic frequency. Solid curve 20 shows the variation in sonic velocity with frequency for a stratum in which all air or gas bubbles are the same size; dotted curve 20A is for a stratum in which the bubbles are varied in size. It will be noted that above a certain critical frequency the velocity is constant; for frequencies below the critical value the velocity varies considerably and becomes quite low for the lower frequencies. If a frequency higher than the critical value is used in the sonic measurements, no velocity error will result from travel through the stratum 11; conversely, if the frequency used is below the critical value, a large velocity error will be caused by travel through stratum 11.

The effects of the velocity variation when using different transmission frequencies are shown in the earth cross sections of FIGURE 3 and FIGURE 4. In FIGURE 3 there is shown the actual cross section of the earth with surface 21, highly aerated or gaseous stratum 22 and reflecting beds 23, 24 and 25. The deeper beds 24 and 25 are arched so as to form a geological structure. If sonic depth measurements are made over this section, using a sonic frequency higher than the critical value shown in FIGURE 2, then the indicated depths are correct and the cross section prepared from the sonic information will approximate the true bedding within the earth. The higher sonic frequency required to maintain constant velocity, however, may not provide sufficient penetration to assure good reflections from the deeper beds 24 and 25. Referring now to FIGURE 4, the cross section shown is prepared from sonic measurements made at a transmission frequency lower than the critical point illustrated in FIGURE 2. The much lower velocity through the highly aerated or gaseous stratum 32 results in larger travel times which increase the apparent depths of reflecting beds 33, 34 and 35 so as to obscure entirely the true arching in the deeper beds. This lower sonic frequency, which encounters a large velocity variation in the stratum 32, may be required to provide sufficiently deep penetration to assure reflections from beds 34 and 35.

In the present invention measurements are made at a plurality of sonic transmission frequencies in order to provide both deep penetration and correct depth indication. Referring now to FIGURE 5, there is shown a block diagram of a sonic prospecting arrangement in accordance with the present invention. A variable frequency driver 40 is provided as a source of electrical impulse power for a sonic transmitter 41 which is coupled closely to the surface so as to create sonic impulses within the earth. A sonic receiver 42 also is coupled closely to the surface so as to intercept sonic signals which have traveled through the sub-suface as a result of the sonic impulses impressed by transmitter 41. Electrical signals from receiver 42, representing the intercepted sonic signals, are applied to a cathode-ray oscilloscope 43 to provide a temporary visual tracing such as is shown in the wave form of FIGURE 6. Recorder 45 is provided to make a permanent visual recording of the electrical signals from receiver 42, provided switch 44 is closed. A scale adjustment 46 is provided in conjunction with recorder 45 so that the zero-time axis of the recorder may be shifted with respect to a standard reference line.

Operation and functioning of the arrangement shown in FIGURE 5 is as follows: Variable frequency driver 40 supplies electrical impulses which are applied as excitation to sonic transmitter 41. These electrical impulses are comprised of a number of cycles of a carrier wave, which may be varied in frequency by suitable adjustment of driver 40. The carrier frequency is adjustable over a considerable frequency range in order to encompass the velocity variation illustrated in waveforms 20 and 20A of FIGURE 2. The impulse duration and repetition rate are selected to be consistent with the desired depth of penetration and the earth constants of the prospect area. Electrical impulses from 40 are applied to a sonic transmitter 41 which then impresses sonic impulses on the surface. Sonic signals resultant from these sonic impulses travel through the sub-surface and are partially reflected from the various bed interfaces. The reflected sonic signals travel back to the surface and are detected by sonic receiver 42 and converted into corresponding electrical signals. These electrical singals are applied to a cathode-ray oscilloscope 43 to form a display of the type shown in FIGURE 6, in which signal trace deflection 50 represents sonic energy reflecting from a shallow sub-surface bed, signal trace deflections 51 and 52 represent deeper reflections, and timing calibration lines 53 permit measurement of travel times. In order to detect the presence of a near-surface velocity lowering stratum, such as illustrated by stratum 11 in FIGURE 1, the operator adjusts the carrier frequency of driver 40 to different values and visually observes the effect on the trace of cathode-ray oscilloscope 43. If there is little or no variation in the elapsed time for the several reflected signals on the cathode-ray trace, then no variable-velocity stratum is present beneath the sonic prospecting equipment. Switch 44 may be closed so as to connect the electrical signals from sonic receiver 42 to recorder 45 and effect a permanent recording. On the other hand, if the reflected sonic signals displayed on cathode-ray oscilloscope 43 change in elapsed time when the carrier frequency of driver 40 is varied, then corrective adjustments must be made before making a permanent recording on recorder 45. The elapsed time for sonic energy to travel from the surface to the shallow bed represented by 50, and return, is shown as T against timing calibration 53. If elapsed time T in FIGURE 6 changes when the carrier frequency of driver 40 is varied, then corrective adjustments may be made in recorder 45 to overcome the effects of the time and velocity variations. The carrier frequency of driver 40 is increased until there is no variation in elapsed time T, as shown on the trace of oscilloscope 43. At this higher frequency the sonic reflection indicated by trace deflection 50 will be easily perceptible, but the trace deflections 51 and 52 corresponding to reflections from deeper beds may be weak or imperceptible. The carrier frequency of driver 40 is next decreased until the elapsed time T, as shown on the trace of oscilloscope 43, increases to a maximum value. At this lower frequency the trace deflections 51 and 52, representing sonic reflections from the deeper beds, will be readily perceptible. Because of the penetration to deeper strata, the sonic signals resulting from use of the lower carrier frequency are preferred for the final recording; however, in view of the velocity error caused by the highly aerated or gaseous stratum, it is necessary to apply a time correction to these lower frequency signals. This time correction is the difference between the elapsed time T measured for the lower frequency carrier and the elapsed time measured for the higher frequency carrier. By adjusting the scale adjustment 46 of recorder 45 in accordance with the elapsed time difference between high and low carrier frequency measurements, the time or depth axis of the final recording may be shifted so as to correct for depth errors due to velocity reduction. After proper setting of scale adjustment 46, the switch 44 may be closed so as to effect recording of the electrical signals from sonic receiver 42 in visual form on recorder 45. By moving over the surface of the earth to different locations and making sonic measurements at a plurality of carrier frequencies, as described, it is possible to obtain a considerable number of sonic depth recordings which may be assembled into a single recording representing a cross-sectional view of the sub-surface.

It will be understood that although only specific procedures and arrangements have been described and illustrated, numerous changes and modifications could be made without departing from the scope of the invention.

Having thus described the invention, what is claimed as new and desired to be secured by Letters Patent is:

1. In a method of sonic prospecting for use in areas characterized by a highly aerated or gaseous stratum beneath the earth's surface utilizing a recorder having an adjustable time scale, the steps of applying to the surface a series of sonic impulses, at selected carrier frequencies, receiving after travel through the subsurface the resultant sonic signals from said series of sonic impulses, converting said sonic signals into electrical signals, adjusting the carrier frequency of said sonic impulses sequentially to each of two frequencies, the higher of said frequencies falling within a high frequency range in which travel-time of said sonic signals is substantially unaffected by frequency variation, the lower of said frequencies being below said range and sufficiently low to enable the sonic signals to penetrate to deeper strata than signals within said range, displaying said electrical signals and determining the difference in travel time between sonic signals at the higher frequency and at the lower frequency, adjusting the time scale on said recorder to conform to the determined difference in travel time between sonic signals at said higher frequency and said lower frequency and applying electrical signals derived from sonic impulses at said lower frequency to a recorder.

2. In a method of sonic prospecting for use in areas characterized by a highly aerated or gaseous stratum beneath the earth's surface utilizing a recorder having an adjustable time scale, the steps of applying to the surface a series of sonic impulses, at selected carrier frequencies, receiving after travel through the subsurface the resultant sonic signals from said series of sonic impulses, converting said sonic signals into electrical signals, adjusting the carrier frequency of said sonic impulses sequentially to each of two frequencies, the higher of said frequencies falling within a high frequency range in which the velocity of said sonic signals is not substantially altered by passage of the signals through gaseous strata, the lower of said frequencies being below said range and sufficiently low to enable the sonic signals to penetrate to deeper strata than signals within said range, measuring the difference in travel time between sonic signals at the higher frequency and at the lower frequency, adjusting the time scale on said recorder to compensate for the said difference in travel time and applying electrical signals derived from sonic impulses at said lower frequency to a recorder.

References Cited in the file of this patent

UNITED STATES PATENTS

| | | |
|---|---|---|
| 2,275,735 | Cloud | Mar. 10, 1942 |
| 2,355,826 | Sharpe | Aug. 15, 1944 |
| 2,688,124 | Doty et al. | Aug. 31, 1954 |
| 2,788,509 | Bolzmann | Apr. 9, 1957 |
| 2,825,886 | Pittman et al. | Mar. 4, 1958 |
| 2,841,777 | Blake et al. | July 1, 1958 |
| 2,925,138 | Becker | Feb. 16, 1960 |

FOREIGN PATENTS

| | | |
|---|---|---|
| 711,139 | Great Britain | June 23, 1954 |

OTHER REFERENCES

Dix: "Seismic Prospecting for Oil," Harper Bros., New York, 1952, pages 82 and 83.